3,575,986
METHOD OF PRODUCING PYRIDINE

Joseph G. Crist, Mount Lebanon Township, Allegheny County, and John O. Hawthorne, Penn Hills Township, Allegheny County, Pa., assignors to United States Steel Corporation
No Drawing. Filed June 6, 1968, Ser. No. 734,882
Int. Cl. C07d 31/06
U.S. Cl. 260—290          6 Claims

ABSTRACT OF THE DISCLOSURE

A method is disclosed for producing pyridine and related compounds in which formamide is used as the nitrogen-bearing starting material. Formamide is reacted with an unsaturated hydrocarbon (e.g. acetylene) in the presence of a catalyst (e.g. alumina spheres coated with zinc fluoride).

---

This invention relates to an improved method of producing pyridine and alkyl pyridines.

Pyridine and alkyl pyridines have important uses as solvents and as intermediates in synthesizing a number of pharmaceuticals, dyestuffs, surface-active agents and insecticides. Pyridine and its derivatives have been obtained as by-products from coal tar, but also have been produced synthetically. Most previous synthetic processes utilize ammonia as the nitrogen-bearing starting material. The ammonia is reacted with one or more reactive compounds, such as unsaturated hydrocarbons, aldehydes or alcohols, in the presence of a suitable catalyst. For descriptions of typical prior processes, reference can be made to Aries Pat. No. 2,700,042, MacLean et al. Pats. Nos. 2,740,789 and 2,780,627, or Cislak et al. Pats. Nos. 2,744,904, 2,807,618 and 2,934,537.

An object of our invention is to provide an improved method of producing pyridine and related compounds in which we use formamide as the nitrogen-bearing starting material.

A further object is to provide an improved method of producing the foregoing compounds with formamide as one of the reacting starting materials and in which we use any of several unsaturated hydrocarbons as the other starting material in the presence of conventional catalysts.

According to our invention we vaporize formamide, mix the vapors with the vapors of a suitable unsaturated hydrocarbon, and bring the gaseous mixture into contact with a solid catalyst at an elevated temperature. Examples of suitable hydrocarbons are acetylene, butadiene and cyclopentadiene. We have used ratios of about 1 to 5 moles of unsaturated hydrocarbon for each mole of formamide in the reactant mixture. We prefer a mole ratio of about 3 to 1. We use any of the catalysts known to be effective in producing pyridine bases by vapor-phase catalytic reaction involving the use of ammonia. Examples of useful catalysts are silica-alumina and alumina. Also, as is known in the prior art, we prefer to use a co-catalyst which we add to the main catalyst by a conventional procedure, such as co-precipitation or impregnation. Examples of useful co-catalysts are zinc oxide, zinc fluoride, cadmium fluoride, and cobalt and molybdenum oxides.

We prefer a catalyst prepared by adding zinc fluoride to "Alcoa H-151" alumina (⅛ inch spherical pellets containing about 6 percent silica and other impurities) in the following manner: To about 200 milliliters of the pellets in a 400 milliliter beaker, we add sufficient distilled water to immerse the pellets completely. Next we add about 30 grams of zinc fluoride tetrahydrate and stir it in with the pellets. A small amount of the zinc fluoride dissolves. We add about 5 milliliters of concentrated hydrochloric acid and stir the mixture to dissolve more zinc fluoride. If all the zinc fluoride dissolves, we add more until a small amount remains undissolved, as evidenced by the presence of zinc fluoride powder adhering to the pellets. We stir the mixture thoroughly again and heat it to about 50 to 60° C. for at least 48 hours. Before using the catalyst, we wash it with distilled water, calcine it at 400° C. for about 15 hours, and cool it in a desiccator, where we store it until actually using it.

The catalyst may be at a temperature in the range of about 350 to 730° C. when we introduce the reactant mixture of formamide and hydrocarbon, but we prefer a temperature between 400 and 550° C. We may allow the reactant vapors to contact the catalyst from 1 to 4 seconds, but we prefer a contact time of about 1.8 seconds. We define "contact time" as the quotient of the bulk volume of the catalyst bed in milliliters divided by the rate of flow of reactant vapors into the bed in milliliters per second. We may use any convenient method of bringing the reactants into contact with the catalyst. For example, we may separately vaporize formamide and hydrocarbon (if liquid) and mix them within the catalyst bed, or we may drop liquid reactants onto the heated catalyst and thereby vaporize and mix them.

As unsaturated hydrocarbon for use in our process, we prefer acetylene, but we may use butadiene or cyclopentadiene or mixtures of any of these, as already explained. Furthermore we need not use formamide as our sole nitrogen-bearing starting material, but we may use ammonia to supply part of the nitrogen. Also we may replace the formamide with reactants which are precursors of formamide, such as methyl formate and ammonia.

The following are specific examples of our invention:

EXAMPLE 1

The apparatus used was a 1⅛ inch I.D. vertical reactor tube equipped at the bottom with gas inlet tubes and connected at the top to a condenser. We connected the condenser to a receiver to enable us to collect and condense the gaseous products. We heated the reactor tube externally and measured the temperature with a movable thermocouple placed within the reaction zone. We packed the reactor tube with 38 grams of zinc fluoride-on-alumina catalyst prepared as described hereinbefore.

We passed acetylene into the reactor at a rate of 320 milliliters per minute (0° C. and 760 millimeters of mercury pressure); we vaporized formamide at a rate of 0.2 milliliter of liquid per minute and also passed the vapor into the reactor. The two reactants passed over the catalyst at a temperature which ranged from 400° C. to 550° C. At intervals of 15 minutes we analyzed the accumulated liquid by gas-liquid chromatography and found that it contained 29 percent pyridine, picolines and lutidines.

EXAMPLE 2

We used the apparatus described in Example 1, but packed the reactor with 19 grams of a silica-alumina catalyst (Cyanamid Aero Extrudate 8020). We vaporized cyclopentadiene at a rate of 0.2 milliliter of liquid per minute and formamide at a rate of 0.1 milliliter of liquid per minute and passed the vapors into the reactor. The two reactants passed over the catalyst at a temperature of about 450° C. The liquid condensed from the reactor effluent contained 6.9 percent pyridine, picolines and lutidines.

EXAMPLE 3

We used the apparatus described in Example 1, and 29 grams of the catalyst described in Example 2. We passed gaseous 1,3-butadiene into the reactor at a rate of 275 milliliters per minute (0° C. and 760 millimeters of mercury pressure); we vaporized formamide at a rate of 0.3 milliliter of liquid per minute and also passed the vapor into the reactor. The two reactants passed over the catalyst at a temperature of about 525° C. The liquid condensed from the reactor effluent contained 12.5 percent pyridine, picolines and lutidines.

EXAMPLE 4

We used the apparatus described in Example 1, and 31 grams of the catalyst described in Example 2 treated with zinc fluoride as hereinbefore described. We passed acetylene into the reactor at a rate of 260 milliliters per minute and ammonia at the rate of 235 milliliters per minute. We vaporized methyl formate at the rate of 0.4 milliliter of liquid per minute and also passed it into the reactor. The reactants passed over the catalyst at a temperature of about 530° C. The liquid condensed from the reactor effluent contained 14.4 percent pyridine, picolines and lutidines.

EXAMPLE 5

We used the apparatus described in Example 1, but packed the reactor with 34 grams of alumina catalyst (Alcoa H–151). We passed acetylene into the reactor at a rate of 150 milliliters per minute, and ammonia at the rate of 75 milliliters per minute. We vaporized formamide at the rate of 0.14 milliliter per minute and passed it into the reactor. The reactants passed over the catalyst at a temperature of about 350° C. The liquid condensed from the reactor effluent contained 1.3 percent pyridine, picolines and lutidines.

We have not described the isolation of the products from the liquid condensate from the reactor effluent in our examples, as we may do this by any of a number of conventional methods well-known in the art of producing pyridine bases by vapor-phase catalytic reaction of ammonia with organic compounds. For example, we may separate the oily condensed products from any aqueous layer, extract the pyridine and alkyl pyridines and then fractionally distill the latter to obtain the pyridine and alkyl pyridines in the pure state.

From the foregoing description it is seen that our invention affords a simple and efficient method of producing pyridine and related alkyl pyridines. One method of synthesizing formamide, our nitrogen-bearing starting material, is by reacting carbon monoxide and ammonia. Hence our method is particularly economical when carried out in localities where these substances are available as cheap by-products.

We claim:

1. A method of producing a mixture of pyridine, picolines and lutidines, said method comprising reacting vaporized formamide with an unsaturated hydrocarbon in the presence of a catalyst at a temperature in the range of about 350 to 730° C. in a ratio of about 1 to 5 moles of unsaturated hydrocarbon for each mole of formamide, said hydrocarbon being selected from the group consisting of acetylene, butadiene and cyclopentadiene, said catalyst being selected from the group consisting of silica-alumina and alumina and including a co-catalyst selected from the group consisting of zinc oxide, zinc fluoride, cadmium fluoride, cobalt oxide, and molybdenum oxide.

2. A method as defined in claim 1 in which the catalyst is silica-alumina spherical pellets and the co-catalyst is zinc fluoride.

3. A method as defined in claim 1 in which the formamide is replaced in part by ammonia.

4. A method as defined in claim 1 in which the contact time is about 1 to 4 seconds.

5. A method as defined in claim 1 in which the formamide is formed by introducing methyl formate and ammonia to the catalyst.

6. A method as defined in claim 1 in which the temperature is in the range of about 400 to 550° C., and the ratio about 3 moles of unsaturated hydrocarbon to each mole of formamide.

References Cited

UNITED STATES PATENTS 3,166,556  11/1965  Fremery et al. _____ 260—290

HENRY R. JILES, Primary Examiner

H. I. MOATZ, Assistant Examiner